US009304801B2

(12) United States Patent
Koorevaar et al.

(10) Patent No.: US 9,304,801 B2
(45) Date of Patent: Apr. 5, 2016

(54) ELASTIC ENFORCEMENT LAYER FOR CLOUD SECURITY USING SDN

(75) Inventors: Tommy Koorevaar, Westmount (CA); Makan Pourzandi, Montreal (CA); Ying Zhang, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 810 days.

(21) Appl. No.: 13/494,637

(22) Filed: Jun. 12, 2012

(65) Prior Publication Data

US 2013/0332983 A1 Dec. 12, 2013

(51) Int. Cl.
*G06F 21/00* (2013.01)
*G06F 9/455* (2006.01)
(Continued)

(52) U.S. Cl.
CPC .......... *G06F 9/45558* (2013.01); *H04L 45/306* (2013.01); *H04L 63/20* (2013.01); *G06F 2009/4557* (2013.01); *G06F 2009/45595* (2013.01)

(58) Field of Classification Search
CPC . H04L 12/4633; H04L 12/4641; H04L 49/70; H04L 61/2038; H04L 61/6022; H04L 45/586; H04L 12/185; H04L 45/16; H04L 45/48; H04L 45/02; H04L 45/66; H04L 67/327; H04L 45/50; H04L 12/4645; H04L 12/42; H04L 41/0896; H04L 45/74; H04L 61/2503; H04L 12/2424; H04L 41/0803; H04L 41/0813; H04L 41/0823; H04L 41/0889; H04L 63/0218; H04L 67/1008; H04L 41/0806; H04L 45/04; H04L 63/20; H04L 45/306; H04L 63/00; H04L 61/256; H04L 41/0893; H04L 61/2517; H04L 61/2521; H04L 63/0245; H04L 45/64; H04L 67/1076; H04L 67/28; H04L 67/2819; G06F 9/45558; G06F 9/455; G06F 15/177; G06F 2009/45595; G06F 9/45533; G06F 2009/4557; G06F 21/00; G06F 21/606; G06F 9/4856; G06F 9/5077; G06F 9/5083; G06F 9/5088; G06F 2221/2141; G06F 2221/2145; G06F 2221/2149; G06F 9/00; G06F 21/53; G06F 11/1484; G06F 2201/815; H04W 12/00
USPC ............... 718/1; 370/392, 389, 401; 709/223, 709/238, 220, 225; 726/1, 13, 11, 14, 12, 726/15, 2, 22, 23, 24, 3, 4, 7, 9
See application file for complete search history.

(56) References Cited

U.S. PATENT DOCUMENTS

2003/0093481 A1* 5/2003 Mitchell et al. ............... 709/206
2010/0020809 A1* 1/2010 Jones et al. ............. 370/395.53
(Continued)

OTHER PUBLICATIONS

"Software Defined Networking", http://en.wikipedia.org/wiki/Software_Defined_networking, 5 pages.
(Continued)

*Primary Examiner* — Marcus R Smith
*Assistant Examiner* — Rose Clark
(74) *Attorney, Agent, or Firm* — Nicholson, De Vos, Webster & Elliot, LLP

(57) ABSTRACT

An efficient elastic enforcement layer (EEL) for realizing security policies is deployed in a cloud computing environment based on a split architecture framework. The split architecture network includes a controller coupled to switches. When the controller receives a packet originating from a source VM, it extracts an application identifier from the received packet that identifies an application running on the source VM. Based on the application identifier, the controller determines a chain of middlebox types. The controller further determines middlebox instances based on current availability of resources. The controller then adds a set of rules to the switches to cause the switches to forward the packet toward the destination VM via the middlebox instances.

20 Claims, 9 Drawing Sheets

(51) Int. Cl.
*H04L 29/06* (2006.01)
*H04L 12/725* (2013.01)

(56) References Cited

U.S. PATENT DOCUMENTS

| | | | | |
|---|---|---|---|---|
| 2010/0037311 | A1* | 2/2010 | He et al. | 726/15 |
| 2010/0071024 | A1* | 3/2010 | Eyada | 726/1 |
| 2010/0322255 | A1 | 12/2010 | Hao | |
| 2011/0022812 | A1* | 1/2011 | van der Linden | G06F 9/5077 711/163 |
| 2011/0023029 | A1* | 1/2011 | Diab et al. | 718/1 |
| 2011/0090911 | A1 | 4/2011 | Hao | |
| 2011/0125894 | A1* | 5/2011 | Anderson | H04L 9/3213 709/224 |
| 2011/0142053 | A1* | 6/2011 | Van Der Merwe et al. | 370/395.1 |
| 2011/0251992 | A1* | 10/2011 | Bethlehem | H04L 12/2863 707/610 |
| 2011/0283016 | A1* | 11/2011 | Uchida | 709/235 |
| 2011/0283017 | A1* | 11/2011 | Alkhatib et al. | 709/244 |
| 2011/0295998 | A1* | 12/2011 | Ferris | G06F 9/5072 709/224 |
| 2012/0185913 | A1* | 7/2012 | Martinez | G06F 9/455 726/1 |
| 2012/0275328 | A1* | 11/2012 | Iwata et al. | 370/252 |
| 2013/0003735 | A1* | 1/2013 | Chao et al. | 370/392 |
| 2013/0042237 | A1* | 2/2013 | Cardona et al. | 718/1 |
| 2013/0060929 | A1* | 3/2013 | Koponen et al. | 709/224 |
| 2013/0304927 | A1* | 11/2013 | Abu-Amara et al. | 709/227 |

OTHER PUBLICATIONS

Dilip, A. J., "A Policy-aware Switching Layer for Data Centers", *SIGCOMM '08*, Aug. 17-22, 2008, pp. 51-62.
Joseph, Dilip A. et al., "A Policy-aware Switching Layer for Data Centers", SIGCOMM '08; Aug. 17-122, 2008, Copyright 2008, pp. 51-62.
Bright, Aeisha, et al., "Enhanced Secure Multi-Tenancy Design Guide", *Cisco Systems Inc.*, URL:https://www.cisco.com/en/US/docs/solutions/Enterprise/Data_Center/Virtualization/securecldg_V2.pdf, (2010), 139 Pages.
Hao, Fang, et al., "Secure Cloud Computing with a Virtualized Network Infrastructure", *Proceedings of the 2nd USENIX conference on Hot tops in could computing*, (2010), pp. 1-7.
Pfaff, Ben, et al., "Open Flow Switch Specification Version 1.1.0 Implemented (Wire Protocol 0x02)", URL: http://www.openflow.org/documents/openflow-spec-v1.1.0.pdf, (Feb. 28, 2011), 56 pages.
International Search Report; Application No. PCT/IB2013/054794; Oct. 2, 2013; 8 pages.
Amazon Web Services, "AWS GovCloud (US)," Amazon Web Services LLC, posted May 1, 2012 to <http://aws.amazon.com/fr/govcloud-us/>, downloaded Jul. 16, 2015, using Internet Archive <http://web.archive.org/web/20120501211419/http://aws.amazon.com/fr/govcloud-us/>, 13 pages.
Amazon Web Services, "Instances dédiées Amazon EC2," Amazon Web Services LLC, posted Jan. 30, 2012 to <http://aws.amazon.com/fr/dedicated-instances/>, downloaded Jul. 16, 2015, using Internet Archive <http://web.archive.org/web/20120130210412/http://aws.amazon.com/fr/dedicated-instances>, 4 pages.

* cited by examiner

ELASTIC ENFORCEMENT LAYER FOR CLOUD SECURITY USING SDN

TECHNICAL FIELD

Embodiments of the invention relate to the field of cloud computing; and more specifically, to security policy management in a cloud computing environment.

BACKGROUND

Cloud computing changes the way people use computers. A basic cloud service model, commonly referred to as the Infrastructure as a Service (IaaS) model, allows cloud customers to dynamically scale up and down their usage on as many machines as needed inside the cloud in a "pay as you go" manner. Thus, the customers can dynamically provision resources to meet their current demand by leasing different amounts of resources from the cloud provider at different times. The cloud provider can leverage economies of scale to provide on-demand resources at a lower cost.

To take advantage of the economic benefits, cloud providers support multi-tenancy on their systems, where virtual machines from multiple customers can share the same sets of physical servers and the network. Given the large amount of servers and customers, the management of the infrastructure needs to be highly automated to allow customer to request the creation or removal of a virtual machine without human intervention.

Despite its promising potentials, a major burden to the widespread adoption of cloud computing is security, as customers are often reluctant to export sensitive data and computation into the cloud. Threats arise not only from privacy leaks at the cloud operating company but also due to the multi-tenant nature of the cloud.

To enforce network security in a cloud environment, cloud providers define network security policies and rules for their data centers and networks. The policies and rules can be quite complex. As a result, in a typical cloud environment, cloud servers can be reached only through complex communication patterns governed by network access control, such as traversal of firewalls and intrusion detection systems (IDSs).

The cloud computing environment is dynamic because many new customers may join and leave the cloud in short periods of time. The complexity of the application behavior and the sheer number of applications make it difficult, costly and error prone to write down by hand different network security enforcement rules for different data centers. Further, it is often necessary for cloud providers to automate and orchestrate security for all aspects of the cloud infrastructure. Human intervention is too slow and not realistic given the pace of changes and the size of the cloud.

Cloud models or gateway-based techniques that are currently available in the industry today sometimes require a specific topology of the cloud network, which cannot adapt to the changing needs of the customers. Some existing methods use Virtual Local Area Networks (VLANs) to configure isolated virtual networks. Nevertheless, the VLAN segmentation approach is static and fails to provide sufficient flexibility and automatism, especially when the number of tenants is large (i.e., beyond 1K). Some flow-based segmentation approach provides traffic isolation, scalability and automatism. Nonetheless, this approach fails to guarantee the consistency of security policies in scenarios of Virtual Machine (VM) migration.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

SUMMARY

Figure 1:
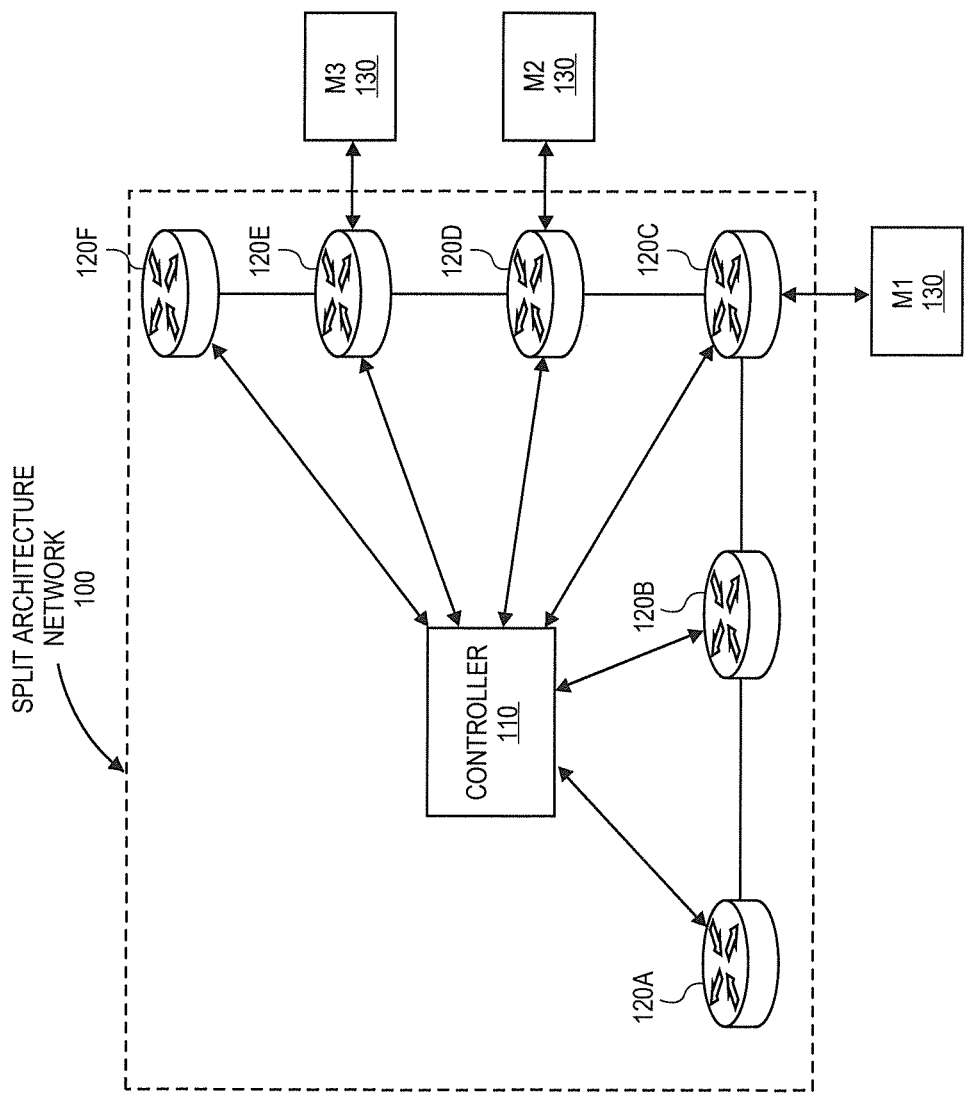
FIG. 1 illustrates an example of a split architecture network according to one embodiment of the invention.

Embodiments of the invention provide an efficient elastic enforcement layer (EEL) for realizing security policies deployed in a cloud computing environment based on a split architecture framework. The split architecture network includes a controller that manages policy enforcement for network security in a cloud computing environment. The split architecture network also includes switches coupled to the controller to provide network connectivity to the cloud computing environment. A source VM and a destination VM execute applications in the cloud computing environment and exchange data via the split architecture network.

In one embodiment, a method performed by the controller includes: receiving a packet originating from the source VM; extracting an application identifier from the received packet, where the application identifier identifies an application running on the source VM; determining a chain of middlebox types based on the application identifier; mapping one or more of the middlebox types in the chain to corresponding one or more middlebox instances based on current availability of resources in the cloud computing environment, where one or more of the middlebox instances perform network security operations on the packet; and adding a set of rules to the switches to cause the switches to forward the packet toward the destination VM via the one or more middlebox instances to thereby enforce network security in the cloud computing environment.

In one embodiment, a network node functioning as the controller includes receiver circuitry configured to receive a packet originating from the source VM, and a processor that includes an elastic enforcement layer module. The elastic enforcement layer module is configured to extract an application identifier from the received packet, where the application identifier identifies an application running on the source VM; determine a chain of middlebox types based on the application identifier; and map one or more of the middlebox types in the chain to corresponding one or more middlebox instances based on current availability of resources in the cloud computing environment. One or more of the middlebox instances perform network security operations on the packet. The network node further includes transmitter circuitry coupled to the processor configured to send a set of rules to the switches to cause the switches to forward the packet toward the destination VM via the one or more middlebox instances to thereby enforce network security in the cloud computing environment.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

An efficient elastic enforcement layer (EEL) is described herein for realizing security policies deployed in a cloud computing environment based on a split architecture framework. Embodiments of the invention are suitable for the dynamic nature of the cloud environment, overcoming the problems caused by the static deployment of the conventional methods.

Embodiments of the invention determine the type of security service that is needed for a particular packet flow based on an application identifier (AppID), which is an identifier of an application running on a VM. Based on the AppID, a controller can determine middlebox types to be traversed by the packet flow.

In one embodiment, a cloud environment can have several controllers for the whole network, one particular controller ruling a particular data center or region of the cloud. The controller of one region can use generic tags (gTags) to set the middlebox types to be traversed by a packet flow, and then delegate the actual instance traversal to the controller of another region. The decision on the actual instances can therefore be made locally to another controller in that region, based on the availability, locations, load, etc., of the middlebox instances.

Furthermore, the use of AppIDs in combination with EEL tags of the packets allows flow aggregation. That is, multiple flows can share the same set of rules while they traverse the network. Flow aggregation reduces the number of rules that need to be pushed down the switches and therefore improves the scalability of the network.

The term "middlebox" herein refers to a physical or virtual security appliance that resides on a machine (e.g., a server computer) in the network and performs security operations on packet flows to enforce network transport policy and security. Virtual security appliances can run on different nodes in a data center, performing the same operations and acting the same way as their counterpart physical security appliances would do. Examples of a middlebox include application firewalls (AppFWs), deep packet inspection (DPI) systems, network address translators, intrusion detection systems (IDSs), multimedia buffer management, etc. In some embodiments, a middlebox can be a physical or virtual network entity that performs operations other than security; e.g., load balancing.

Before describing details of the embodiments of the invention, the structure of a spilt architecture network is explained first. A split architecture network has a control plane, which includes a small number of controllers, and a forwarding plane (also referred to as "data plane"), which includes multiple forwarding elements, i.e., switches. A split architecture network is a distributed system in which the control plane is decoupled from the forwarding plane. Switches are interconnected with each other and with the controllers. The controllers instruct the switches' forwarding behavior.

A split architecture network contains a network-wide control platform, running on one or more servers in the network, overseeing a set of simple switches. In a split architecture network, controllers and switches use a protocol to communicate and exchange information. An example of such protocol is OpenFlow (described in OpenFlow Switch Specification version 1.1.0, 2011), which provides an open standard method for a switch to communicate with a controller, and it has drawn significant interest from both academics and industry.

Traditional router architecture follows an integrated design where the control plane and data forwarding engine are tightly coupled in the same box, which usually results in overly complicated control plane and complex network management. Due to the high complexity, equipment vendors and network operators are reluctant to employ changes, and the network itself is fragile and hard to manage. This is known to create a large burden and high bearer to new protocol and technology developments.

A main task of a switch is to forward packets from an ingress port to an egress port, according to the rules in the flow table programmed by a controller. Each flow entry contains a set of actions such as forwarding packets to a given port, modifying certain bits in the packet header, or encapsulating packets to the controller, or simply dropping the packets. A switch can forward a first packet in a flow to a controller to trigger a new flow entry being programmed. A switch can also forward all of the slow-path packets to a controller for processing such as Internet Control Message Protocol (ICMP) packets. The concept of a flow can be defined broadly, e.g., a Transport Control Protocol (TCP) connection, or all traffic from a particular Media Access Control (MAC) address or Internet Protocol (IP) address.

A controller adds and removes flow entries from the flow tables in the switches. A controller defines the interconnection and routing among the set of data plane switches. It also handles network state distribution, such as collecting information from the switches and distributing routing instructions to them. It can also be programmed to support any new addressing, routing, and complex packet processing applications. The controller is the "brain" of the network. A switch needs to connect to at least one controller to function correctly. When a switch receives a new flow without knowing where to send the packets, the switch forwards the first packet of the flow to the controller. Upon receiving the packet, the controller programs a new routing entry on the switch for the switch to use for forwarding other packets in the flow.

FIG. 1 illustrates an example of a split architecture network 100 that includes a controller 110 coupled to a set of switches 120A-F according to one embodiment. Some of the switches (e.g., 120C, 120D, and 120E) are connected to middleboxes 130 (e.g., M1, M2 and M3). One or more middleboxes 130 perform security operations on the packets that they receive. Each middlebox 130 is connected to an ingress switch from which the middlebox 130 receives packets, and an egress switch to which the middlebox sends processed packets. An ingress switch of a middlebox is a previous-hop switch to the middlebox on the path from a source to the middlebox. An egress switch of a middlebox is a next-hop switch to the middlebox on the path from the middlebox to a destination. The ingress switch and the egress switch are each referred to as an edge switch. In this example, each middlebox 130 use the same switch as its ingress switch and egress switch; e.g., switch 120C is both an ingress switch and an egress switch for M1. An ingress switch and an egress switch can be different switches in alternative embodiments.

Embodiments of the invention provide efficient policy enforcement for network security by leveraging the Software-Defined Networking (SDN) with split architecture, building the policy control as an application of an Openflow controller. It is recognized that commodity switches have limited memories and table entries. Therefore, scalability is a concern if each switch needs to install one rule for every application and for each tenant. Embodiments of the invention propose a hierarchical solution, the key idea of which is to pre-create the templates for enforcement rules that are independent of tenants and applications. The cloud tenants (or tenant users or administrators) can use these templates to define their security architecture independent from the network structure. Thus, a tenant can define a sequence of middlebox types to be traversed, depending on the type of communication that occurs between different VMs. For example, a tenant may want to deploy a 3-tier service that includes Web server, business logic and database. The tenant can use the templates to describe that a firewall middlebox is in front of the Web server, an IDS middlebox is between the Web server and the business logic, and an AppScan middlebox is in front of the database.

The elastic enforcement layer for cloud network security described herein has the following characteristics:

Traffic traverses middleboxes in the sequence required by the tenant.
The policies are easily re-configured in response to dynamic demands and VM migrations.
Traffic does not traverse unnecessary middleboxes.
The decision on which middlebox instances to be used is based on the availability of resources in the cloud infrastructure.
The decision on which middlebox instances to be used can be deferred as the first packet of a flow makes its way from the source to the destination. Deferring the choice of middlebox instance in the SDN can be beneficial when dealing with large cloud infrastructure (i.e., more than ten thousand blades, deployed through several data centers) where the information on the availability of the middleboxes are not available to one logical element capable of making the decision on all of the middlebox instances for the entire path from the source to the destination.

Basic concepts and building blocks of the elastic enforcement layer are described below. In one embodiment, tenants define the security design they want to apply to a VM (or a group of VMs) by designating an AppID to represent a chain of middleboxes that have to be traversed by packets emitted by the VM (or the group of VMs). Each AppID identifies an application or a group of applications that use the same chain of middleboxes. A group of VMs can run the same application and use the same AppID; e.g., the VMs that run a Web server.

In one embodiment, the chain of middleboxes can be, for example, an IDS, followed by an AppFW and a DPI. The controller can enforce the steering of the flows through different middleboxes.

Each physical server that hosts the VMs has a running hypervisor that manages the VMs. The hypervisor can insert this AppID into the packets emitted by a VM. When the first packet of a flow reaches a switch, they are forwarded into the controller, which in turn retrieves the AppID from the packet. Based on the AppID, the controller determines the chain of middleboxes to be traversed.

Embodiments of the invention utilize EEL tags in the packet headers to set the paths of the flows. These tags can be added at the Ethernet layer. In one embodiment, an MPLS label implementation in OpenFlow can be used for the EEL tags. As the MPLS label pushing, popping and setting are supported by OpenFlow 1.1, no modification needs to be made to the switches when MPLS labels are replaced by EEL tags. The MPLS label value is 20-bit long and can have up to one million different values. Generally, this 20-bit long field is large enough to cover all middlebox instances even for a very large cloud infrastructure. In alternative embodiments, mechanisms and technologies other than the MPLS can also be used for implementing the EEL tags.

In one embodiment, the controller chooses the set of middlebox instances dynamically at the time of communication between VMs, based on the current availability of resources in the cloud infrastructure, VM life cycle, or any other cost function to optimize the use of the cloud resources. An EEL tag in a packet is used to define the next middlebox to which a switch is to send the packet. In order to route packets accordingly along the switches, the controller has a mapping table between all middlebox instances and the EEL tags.

After the controller chooses the set of middlebox instances, the controller inserts a rule at the emitting VM's edge switch in order to push an EEL tag to the packet and forward the packet to the next hop. This EEL tag indicates which middlebox is the next middlebox to be traversed by the packet. The controller also adds a rule to the middlebox's ingress switch, where the rule includes popping the EEL tag and forwarding the packet to the middlebox. At the middlebox's egress switch, the controller adds a rule including pushing the tag corresponding to the next middlebox's instance onto the packet. Along the path to the next middlebox, the controller adds a rule to the switches on the path that includes forwarding the packet to the next hop towards the next middlebox according to the EEL tag of the packet. In the case where there is no more middlebox to traverse, the controller adds a rule to the last switch on the path, where the rule includes popping the tag from the packet and routing the packet to the destination VM.

In one embodiment, the EEL tags are subdivided in two kinds of tags: generic tags (gTags) that each corresponds to a middlebox type, and instance tags (iTags) that each corresponds to a middlebox instance. In one embodiment, the range of EEL tag values can be divided such that a gTag is an integer in the range of [0,1023] and iTag is an integer in the range of $[1024, 2^{20}]$. It is noted that the gTags and iTags ranges are configurable.

A gTag is also referred to a wildcard or a wildcard tag. A gTag is a special tag in that it only defines the next middlebox type, instead of defining the middlebox instance. This is useful when the source and destination VMs are in different data centers or different regions (also referred to as areas or zones), which may be ruled by different controllers. In addition, a gTag is also useful when a controller in the path between the source and the destination cannot make the decision on which instances to use (for lack of information on the middlebox instances availability, security constraints, etc.). When a switch receives such a tagged packet, it sends the packet to its controller, which either decides to replace it with a middlebox's instance tag or to forward the packet to the next switch towards its destination. In order to avoid ambiguous resolving of wildcards, a particular middlebox type only appears once in a chain of middleboxes. That is, $\forall (gTag_i, gTag_j)$ in the same chain of middlebox, $gTag_i \neq gTag_j$.

In one embodiment, the iTags are subdivided into ranges that each corresponds to a particular type of middlebox. For example, iTags (1024-2047) correspond to AppFW instances, iTags (2048-3072) correspond to IDS instances, and so on. The subdivision of iTags can reduce the load on the controller and thus improve scalability, as there is no need for the controller to maintain a table mapping middlebox instances to middlebox types.

Figure 2:
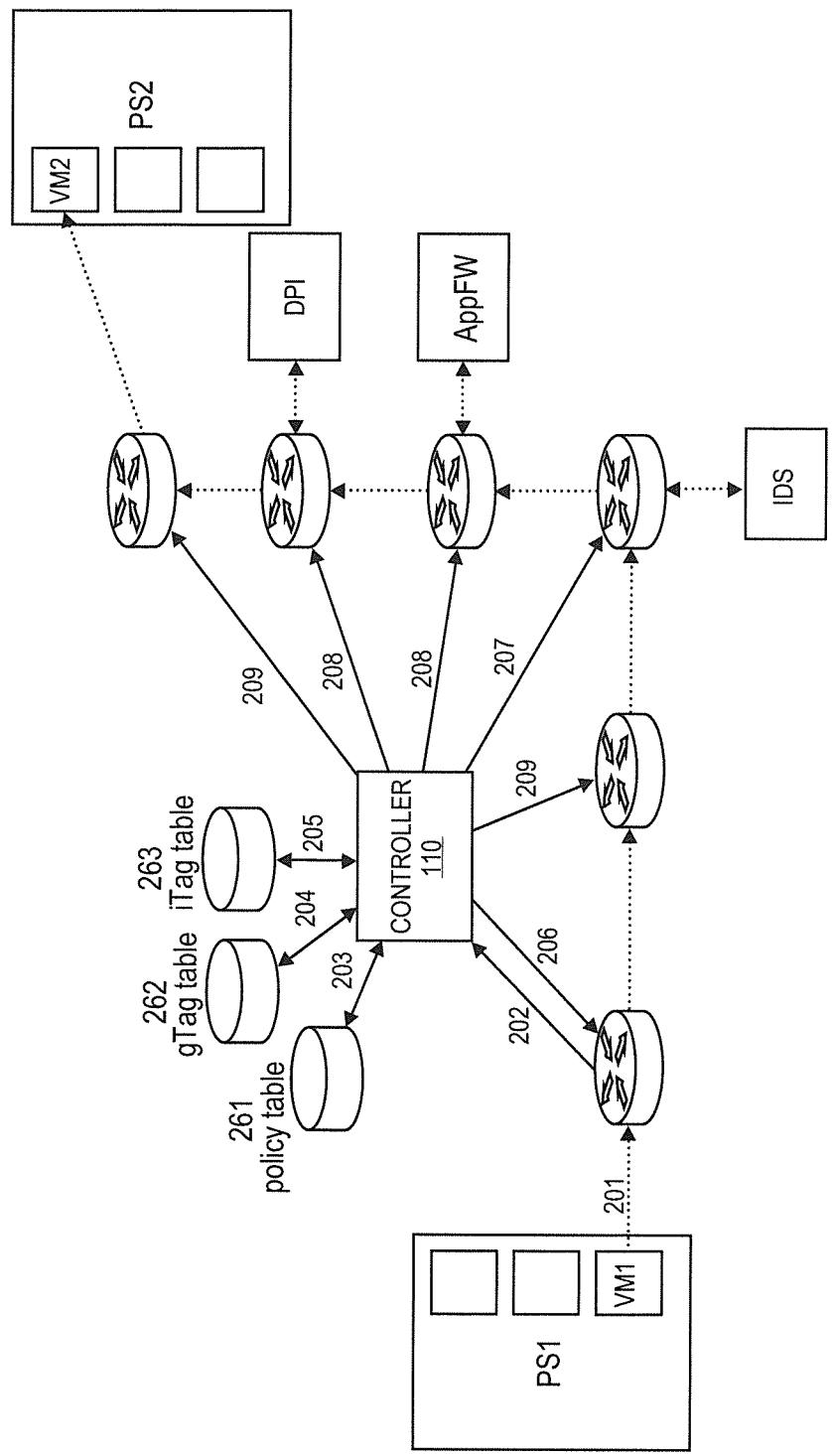
FIG. 2 illustrates an example of a use case in which source and destination VMs are in the same area according to one embodiment of the invention.

FIG. 2 illustrates an example of a simple use case according to one embodiment of the invention. This use case illustrates how a simple chain of middleboxes is set for a particular flow. This use case also illustrates how to enforce the traversal of the chain of middleboxes between a pair of VMs that are located within the same area controlled by the same controller.

The example of FIG. 2 illustrates the data structures maintained or accessible by the controller 110 according to one embodiment. The first table is a policy table 261, which matches a given AppID to a chain of gTags. The second table is a gTag table 262, which matches a given gTag to a range of iTags. The third table is an iTag table 263, which matches a given iTag to the IP address of a middlebox instance that corresponds to the given iTag.

In this example, it is assumed that a tenant defines that the traffic emitted by VM1 corresponds to AppID-9, which means that the traffic from VM1 is to go through an IDS, an AppFW and a DPI. Also assume that VM1 (located on a physical server PS1) is trying to communicate with VM2 (located on a physical server PS2). Both PS1 and PS2 are in the same data center or same region (also referred to as "area" or "zone") that is controlled by the same controller. Each of PS1 and PS2 runs a hypervisor to manage its VMs. To simplify the illustration, in this example and the examples that follow, the ingress switch and egress switch of the middleboxes in the figures are shown to be the same switch. It is understood that the ingress switch and egress switch can be different switches.

Figure 3:
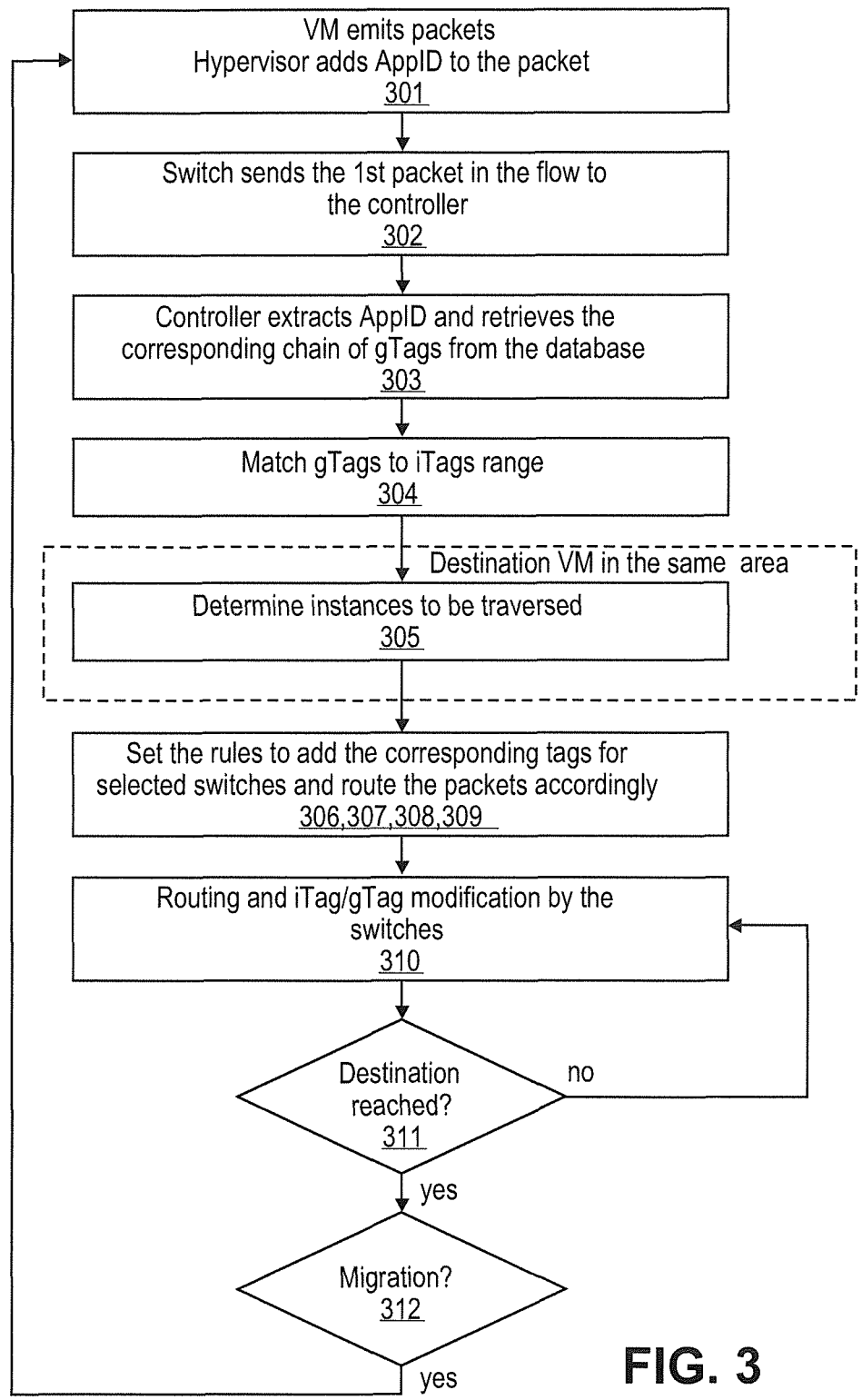
FIG. 3 is a flow diagram illustrating a method for the use case of FIG. 2 according to one embodiment of the invention.

Also referring to FIG. 3, the flow diagram of FIG. 3 illustrates a method 300 for intra-area policy enforcement, where the source VM (VM1) and the destination VM (VM2) are located in the same area and controlled by the same controller. As the operations of FIG. 2 correspond to the operations of FIG. 3, the description below will refer to both FIG. 2 and FIG. 3.

When VM1 starts emitting a flow of packets, the hypervisor on PS1 intercepts these packets and inserts an AppID into the header (e.g., the IP options field) of each packet (201, 301). The switch located at the edge of VM1 forwards the first packet to the controller 110 (202, 302). The controller 110 extracts the AppID from the packet and determines the chain of gTags to be traversed by consulting the policy table 261 (203, 303). The controller 110 then matches each gTag to an iTags range by looking up the gTag table 262 (204, 304). From the iTags range, the controller 110 based on cloud resource availability chooses a middebox instance to which to send the packet (205, 305). The controller 110 chooses a middlebox instance for each gTag in the chain. Assume that the chosen instances of IDS, AppFW and DPI correspond to iTags 2070,1045 and 3093, respectively. The controller 110 then uses the iTag table 263 to identify the IP addresses of the chosen middlebox instances.

After the middlebox instances are chosen, the controller 110 sets a set of rules for the switches and sends the rules to the switches. These rules are added to the flow tables of the switches, which route the flow of packets accordingly. In this example, the controller adds two new flow entries into the VM1's edge switch (206, 306):
Packets from VM1 to VM2 are tagged with EEL tag 2070.
Packets with EEL tag 2070 are routed to the next switch towards the IDS 2070 instance.

Note that a switch can determine whether a flow is from VM1 to VM2 by looking at the source and destination IP addresses, source and destination port numbers and protocol type (i.e., the 5-tuple), or other identifiers carried by the packets. The controller also adds three new flow entries into the IDS's ingress and egress switch (207, 307):
Packets tagged with EEL tag 2070 must have their tag popped and be forwarded to the IDS (ingress).
Packets out of the IDS, from VM1 to VM2, must have the EEL tag 1045 pushed (egress).
Packets with EEL tag 1045 are routed to the next switch towards the AppFW 1045 instance (egress).

Similar rules to the previous ones (206, 306, 207 and 307) are added to all the middleboxes edge's switch (208, 308). The rule for the egress switch of the last middlebox in the chain specifies that the flow of packets is to be routed to the next switch towards the destination VM.

Along the path from VM1 to VM2, the controller adds a rule to each of the switches that are on the path but are neither the ingress nor the egress switches of the middleboxes. The rule specifies that the switch is to forward the flow of packets towards a middlebox instance, based on the EEL tags of the packets (209, 309). After the rules are set, the switches can start routing the packets, modifying the EEL tags of the packets according to the rules (310). The routing operation of the switches continues until the packets reach their destination VM (311).

FIG. 3 also shows a scenario in which the source VM (VM1) migrates from one physical server to another physical server (312). In this scenario, the operations of blocks 301-311 repeat for the flow of packets emitted by VM1 after the migration. The AppID of this flow is the same as before the migration. Thus, the controller 110 can map this AppID to the same chain of gTags, and can determine the corresponding middlebox instances based on the resource availability at or after the time of migration. Further details regarding VM migration will be described below with reference to FIG. 7.

Figure 4:
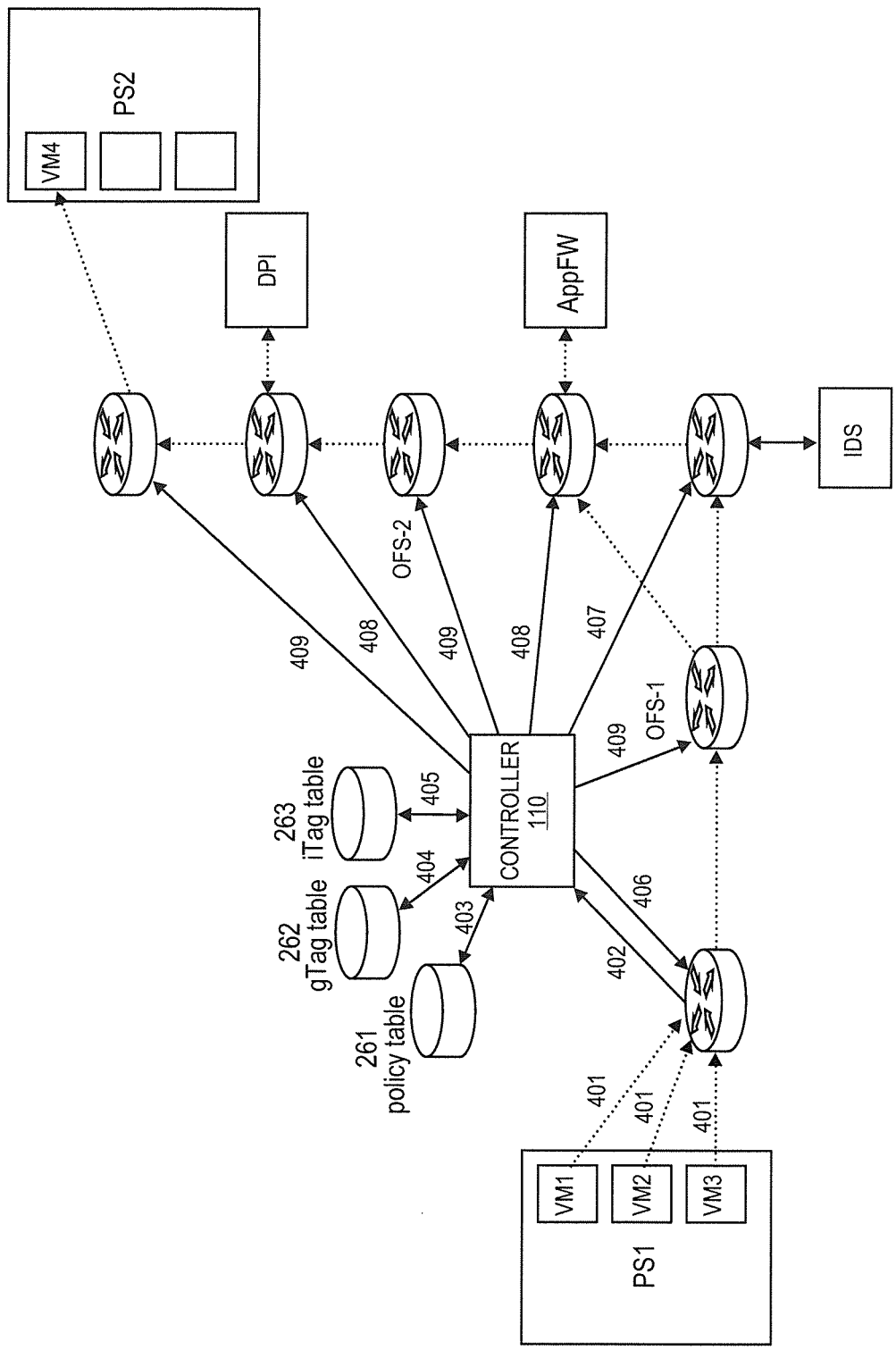
FIG. 4 illustrates an example of flow aggregation according to one embodiment of the invention.

FIG. 4 illustrates an example of a scalable design for flow aggregation according to one embodiment of the invention. One major drawback of existing solutions is that they require at least one rule per VM, as their rules match the destination and source MAC addresses and ports. As illustrated in this example, the use of EEL tags allows the aggregation of flows and thereby reduces the number of rules pushed down the switches. The flow aggregation and the reduction of rules inside the switches improve the scalability of the network.

The example of FIG. 4 is a variation of the example of FIG. 2. In this example, there are three source VMs (VM1, VM2 and VM3) communicating with the same destination VM (VM4). Assume that the tenant has defined the traffic emitted by VM1 and VM2 to correspond to AppID-9, which means that the traffic from these two VMs is to go through an IDS, an AppFW and a DPI. Traffic emitted by VM3 corresponds to AppID-10, which means that the traffic from VM3 is to only go through an AppFW and a DPI. Assume that VM1, VM2 and VM3 are trying to communicate with VM4, which is in the same region as VM1, VM2 and VM3 and is controlled by the same controller.

When VM1, VM2 and VM3 start emitting packets, these packets are intercepted by the hypervisor on PS1, which inserts the respective AppIDs into their headers (401). Steps 402, 403, 404 and 405 follow step 401 and they are the same as steps 202, 203, 204 and 205, respectively. After the middlebox instances are chosen, the controller 110 adds the following new flow entries into the PS1's edge switch (406):

Packets from VM1 to VM4 are tagged with EEL tag 2070.
Packets from VM2 to VM4 are tagged with EEL tag 2070.
Packets from VM3 to VM4 are tagged with EEL tag 1045.
Packets with EEL tag 2070 are routed to the next switch towards the IDS 2070 instance.

The controller 110 then adds new flow-entries into the IDS's ingress and egress switch (407):

Packets tagged with EEL tag 2070 must have their tag popped and be forwarded to the IDS (ingress).
Packets out of the IDS, from VM1 to VM4, must have the EEL tag 1045 pushed (egress).
Packets out of the IDS, from VM2 to VM4, must have the EEL tag 1045 pushed (egress).
Packets with EEL tag 1045 are routed to the next switch towards the AppFW 1045 instance (egress).

Similar rules to the previous ones (407) are added to all of the middleboxes' edge switches (408). The rule for the egress switch of the last middlebox in the chain specifies that the flow of packets is to be routed to the next switch towards the destination VM.

Along the path from the source to the destination, the controller 110 adds a rule to each of the switches that are on the path but are neither the ingress nor the egress switches of the middleboxes. The rule specifies that the switch is to forward the flow of packets to the next switch towards the middlebox instance, based on the EEL tags of the packets (409).

The example of FIG. 4 illustrates how the rules for multiple flows can be aggregated. Particularly, the rules at a middlebox's ingress switch can be set to allow the switch to match all of the incoming flows directed to this particular middlebox in a simple manner. A single rule can be set such that packets heading toward the same middlebox can be given the same EEL tag and be routed in the same way, even though these packets may belong to different flows, have different AppIDs, originating from different VMs, and/or destined for different VMs. In this example of three different flows, only two rule rules are pushed into the switch OFS-1 (routing the packets toward either the IDS or the AppFW) and only one rule is pushed into the switch OFS-2 (routing the packets toward the DPI).

Figure 5:
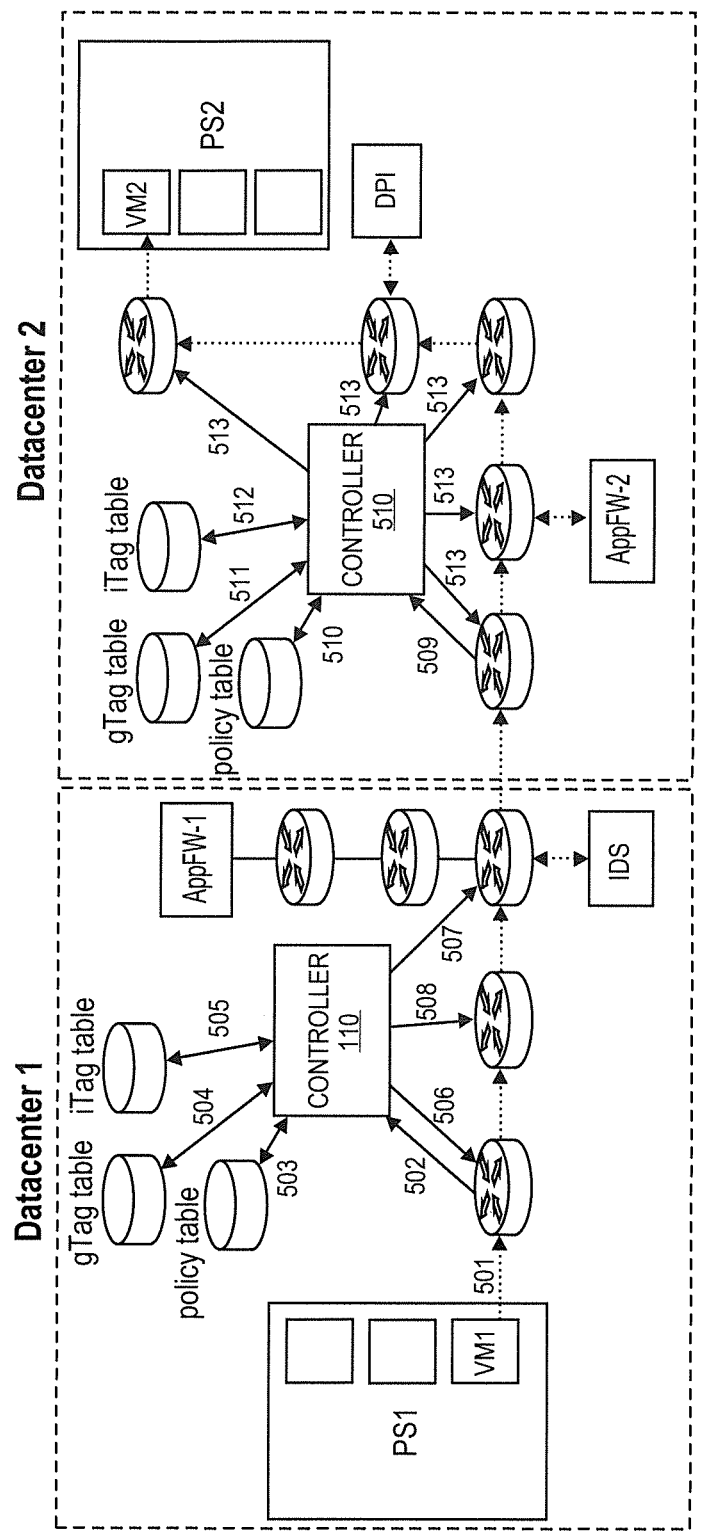
FIG. 5 illustrates an example of a use case in which source and destination VMs are in different areas according to one embodiment of the invention.

FIG. 5 illustrates an example of a wildcard design for rule matching. A wildcard is a gTag, which only describes the type of a middlebox but not the specific instance of the middlebox. The use of gTags improves the scalability of a cloud network as it allows the combined usage of several controllers and improved utilization of the cloud resources. In the example of FIG. 5, the source and destination VMs are in regions or areas ruled by different controllers. A controller in one region has the ability to delegate the responsibility of applying the security measure to the controller in another region.

In a cloud environment, there can be multiple controllers (e.g., controllers 110 and 510) for the whole network, one for each data center or region of the cloud. The controller 110 of a first region can set a chain of middlebox type to be traversed by a flow, and then delegate the actual instance traversal to the controller 510 of the second region. This decision can be made based on the availability or location of the middlebox instances.

When a first packet of a flow reaches the second region, the packet is forwarded to the controller 510, which determines what middleboxes in the chain have not been traversed yet, based on the AppID and the EEL tag of the received packet. The controller 510 can either forward the packet to another region, or map the EEL tag (which is a gTag) into an iTag. If the iTag can be determined, the controller 510 then proceeds with a process similar to the one described above in the simple use case of FIG. 2 and FIG. 3.

In the example of FIG. 5, it is assumed that the chain of middleboxes remains IDS, AppFW and DPI, and that the gTag corresponding to an AppFW is 18.

Figure 6:
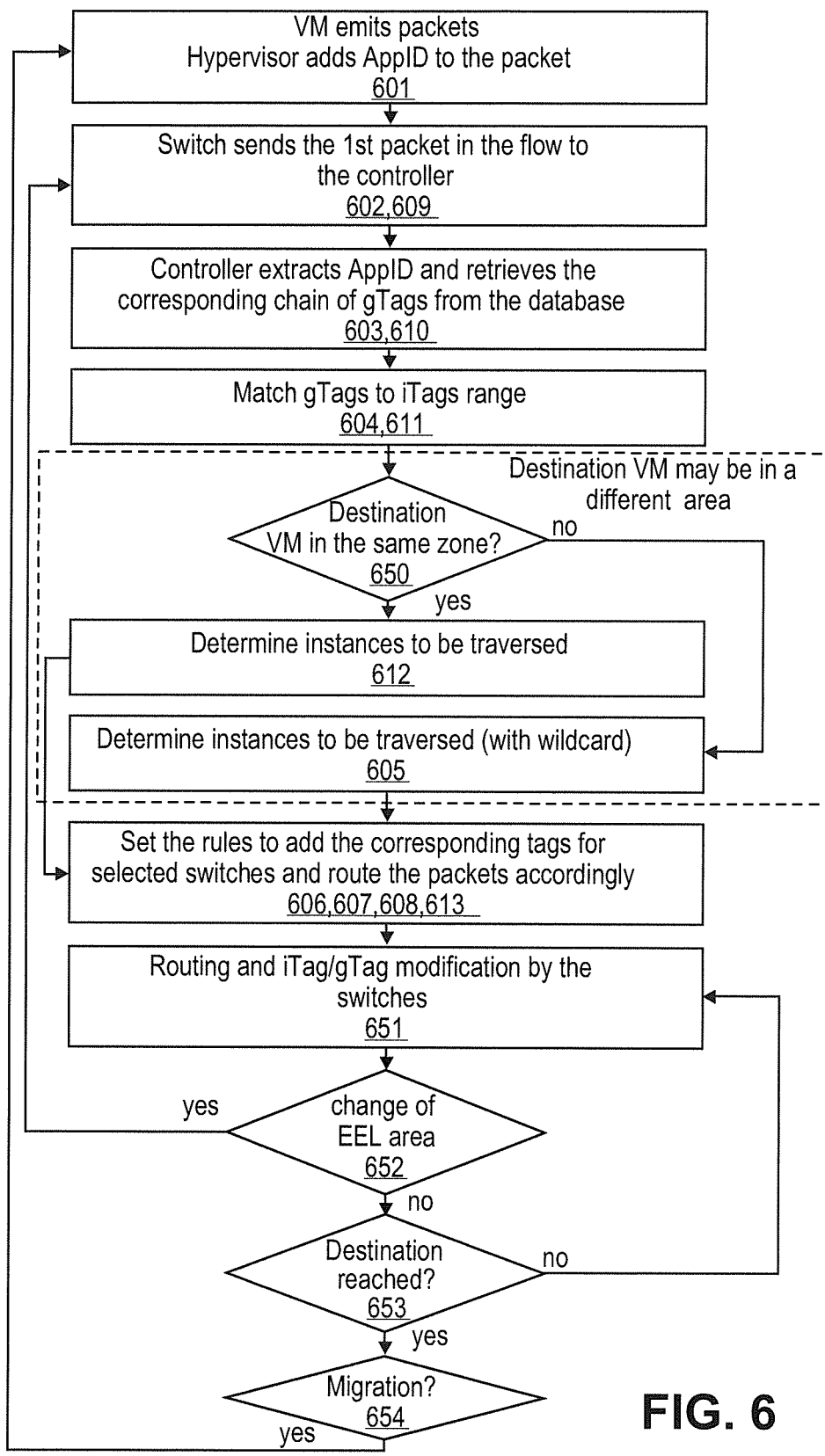
FIG. 6 is a flow diagram illustrating a method for the use case of FIG. 5 according to one embodiment of the invention.

Also referring to FIG. 6, the flow diagram of FIG. 6 illustrates a method 600 for inter-area policy enforcement, where the source VM (VM1) and the destination VM (VM2) are located in different areas and controlled by two different controllers. As the operations of FIG. 5 correspond to the operations of FIG. 6, the description below will refer to both FIG. 5 and FIG. 6.

When VM1 starts emitting a flow of packets, the hypervisor on PS1 intercepts these packets and inserts an AppID into the header (e.g., the IP options field) of each packet (501, 601). The switch located at the edge of VM1 forwards the first packet to the controller 110 (502, 602). The controller 110 extracts the AppID and determines the chain of gTags to be traversed by consulting the policy table 261 (503, 603). The controller 110 then matches each gTag to an iTags range by looking up the gTag table 262 (504, 604). From the iTags range, the controller 110 chooses an IDS instance 2070. As the source VM (VM1) and the destination VM (VM2) are in different data centers (650), an AppFW can be chosen from either data center. Based on the availability (or unavailability) of AppFW-1, the controller 110 decides to defer the choice of an AppFW instance to another controller and use a wildcard for the AppFW (505, 605).

After the IDS instance is chosen, the controller 110 sets rules for the switches. These rules are added to the flow tables of the switches, which route the flow of packets accordingly. In this example, the controller 110 adds two new flow entries into the VM1's edge switch (506, 606):

Packets from VM1 to VM2 are tagged with EEL tag 2070.
Packets with EEL tag 2070 are routed to the next switch towards the IDS 2070 instance.

The controller 110 also adds three new flow entries into the IDS's ingress and egress switch (507, 607):

Packets tagged with EEL tag 2070 must have their tag popped and be forwarded to the IDS (ingress).
Packets out of the IDS, from VM1 to VM2, must have the EEL tag 18 pushed (egress).
Packets with EEL tag 18 are routed to the next switch towards VM2 (egress).

Along the path from the source to the destination, the controller 110 adds a rule to each switch on the path to forward each packet towards the next middlebox instance, based on the EEL tag of the packet (508, 608). After the rules are set, the switches can start routing the packets, modifying the EEL tags of the packets according to the rules (651). The routing operation of 651 continues until the packets reach the first switch of the second area (652), where the first packet of the flow is sent to the second controller 510 (509, 609). The controller 510 resolves the AppID in order to know what types of middlebox are to be traversed (510, 610). The controller 510 then resolves the gTags in order to know what types of middlebox have not been traversed (511, 611). Because VM2 is in the same area as the controller 510, the controller 510 can choose the middlebox instances (e.g., AppFW-2) to be traversed (512, 612). After the middlebox instances are chosen, the controller 510 adds rules to its switches, where the rules are similar to the ones described above in connection with the controller 110 (513, 613). The routing operation of the switches continues until the packets reach their destination VM (653).

FIG. 6 also shows a scenario in which the source VM (VM1) migrates from one physical server to another physical server (654). In this scenario, the operations described above in this example repeat for the flow of packets emitted by VM1 after the migration. The AppID of this flow of packets is the same as before the VM1's migration. Thus, the controllers 110 and 510 can map this AppID to the same chain of gTags, and can determine the corresponding middlebox instances based on the resource availability at or after the time of migration. Further details regarding VM migration will be described below with reference to FIG. 7.

Figure 7:
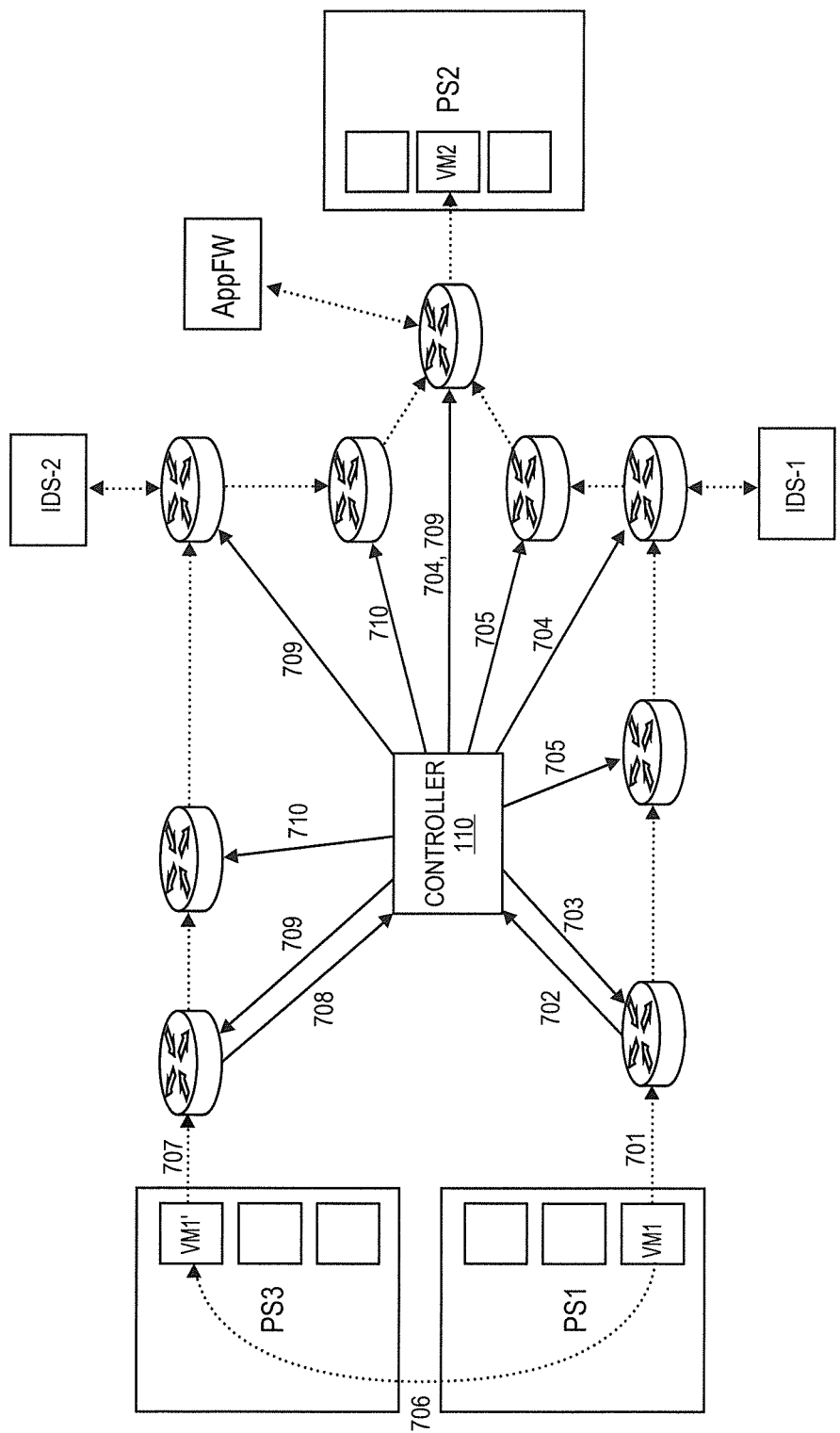
FIG. 7 illustrates an example of VM migration according to one embodiment of the invention.

FIG. 7 is an example illustrating the resilience of the security measures upon VM migration according to one embodiment of the invention. After a VM migrates and starts emitting packets again, the process is the same as mentioned above as shown in FIGS. 2-6, except that the middlebox instances traversed by the packets can be different before and after the migration. As the AppID of the packets stays the same before and after the migration, the chain of middlebox types also stays the same. Thus, the security measures that are applied to the flow are sticking to the flow through migration.

In the example of FIG. 7, the chain of middleboxes is IDS and AppFW. Assume that the iTag corresponding to the IDS-1 is 2070, the iTag corresponding to the AppFW is 1045, and the iTag corresponding to the IDS-2 is 2080.

When VM1 starts emitting a flow of packets, the hypervisor on PS1 intercepts these packets and inserts an AppID into the header (e.g., the IP options field) of each packet (701). The switch forwards the first packet of the flow to the controller 110 (702). The controller 110 adds two new flow entries into the edge switch of VM1 (703):

Packets from VM1 to VM2 are tagged with EEL tag 2070.
Packets with EEL tag 2070 are routed to the next switch towards the IDS 2070 instance.

The controller also adds three new flow-entries into the IDS-1's ingress and egress switch (704). Similar rules are set on the AppFW's ingress and egress switch.

Packets tagged with EEL tag 2070 must have their tag popped and be forwarded to the IDS (ingress).
Packets out of the IDS, from VM1 to VM2, must have the EEL tag 1045 pushed (egress).
Packets with EEL tag 1045 are routed to the next switch towards the AppFW 1045 instance (egress).

Along the path from the source to the destination, the controller 110 adds a rule to each switch on the path to forward each packet towards the next middlebox instance, based on the EEL tag of the packet (705).

Thereafter, VM1 migrates from PS1 to PS3 and becomes VM1' (706). When VM1' starts emitting a flow of packets, the hypervisor on PS3 intercepts these packets and inserts an AppID into the header (e.g., the IP options field) of each packet (707). The controller 110 then adds flow entries into the edge switch of VM1', the ingress and egress switches of IDS and AppFW in the same way as before the migration (708, 709). However, after the migration the IDS iTag can change to, e.g., 2080, which corresponds to IDS-2. The rule at the AppFW egress switch may be modified in order to be consistent with the new source information (e.g., if VM1 and VM1' do not have the same MAC address).

Along the path from the source to the destination, the controller 110 adds a rule to each switch on the path to forward each packet towards the next middlebox instance, based on the EEL tag of the packet (710). After the rules are set, the switches can start routing the packets, modifying the EEL tags of the packets according to the rules, in the same way as before the migration of VM1.

The example of FIG. 7 illustrates how the security measures persist through a migration. New rules are enforced when VM1' starts emitting packets, in the same way as before the migration. The rules that correspond to the old placement of VM1 before the migration will timeout (e.g., be discarded) in order to reduce the load on the switches. Even though the security appliances (i.e., the middlebox instances) traversed are not the same as they were prior to the migration, the security chain is respected in terms of the middlebox types.

Figure 8:
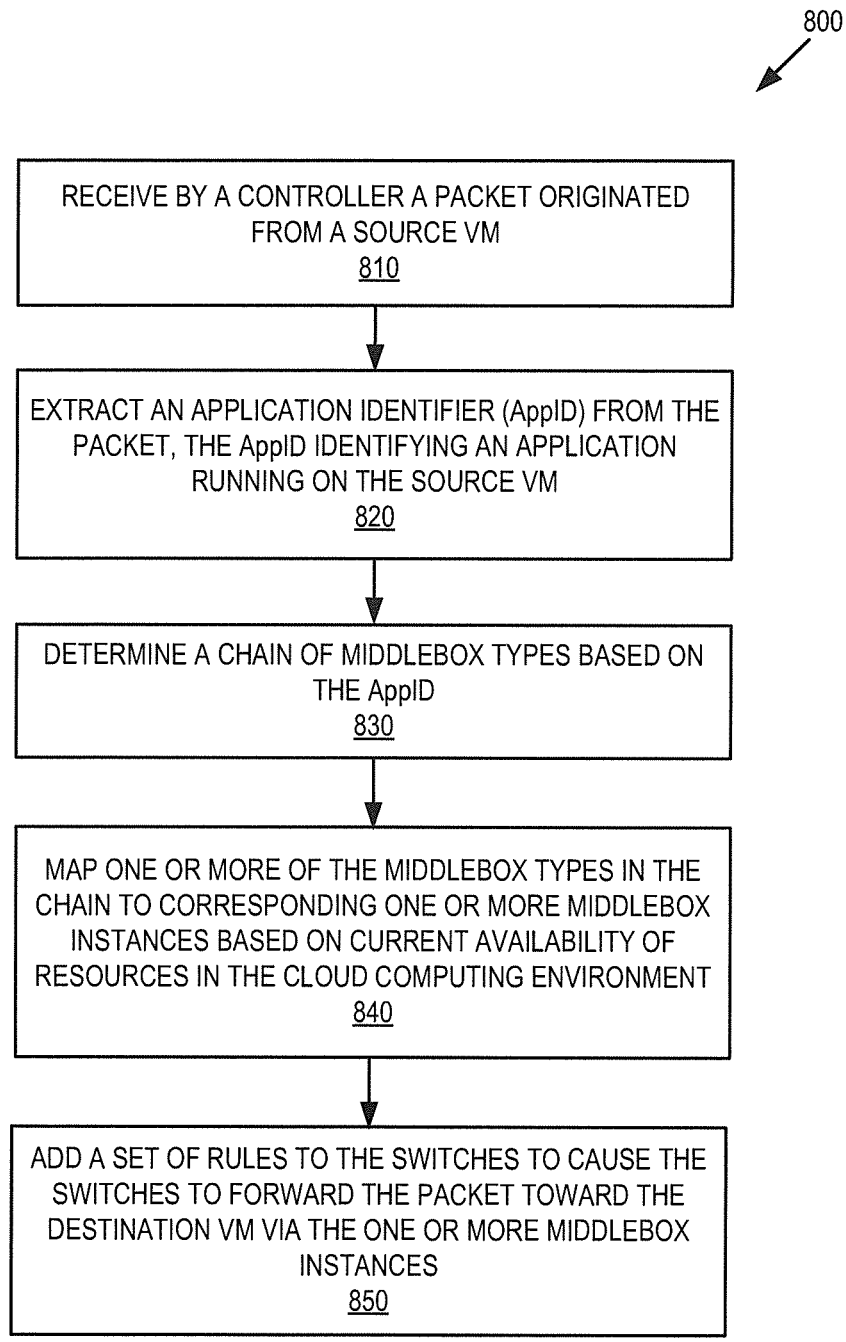
FIG. 8 is a flow diagram illustrating a method for network security policy enforcement in a cloud computing environment according to one embodiment of the invention.

FIG. 8 illustrates one embodiment of a method 800 for an elastic enforcement layer to enforce security policies in a cloud computing environment. In one embodiment, the method 800 may be performed by a controller of a split architecture network, such as the controller 110 of FIG. 1.

In one embodiment, a controller receives a packet originating from a source VM (block 810). The controller extracts an AppID from the packet (820), where the AppID identifies an application running on the source VM. Based on the AppID, the controller determines a chain of middlebox types (830). The controller maps one or more of the middlebox types in the chain to the corresponding one or more middlebox instances based on current availability of resources in the cloud computing environment (840), wherein one or more of the middlebox instances perform network security operations on the packet. The controller then adds a set of rules to the switches to cause the switches to forward the packet toward the destination VM via the one or more middlebox instances (850), to thereby enforce network security in the cloud computing environment. In one embodiment, the rules specify how a switch is to process (e.g., push or pop) an EEL tag carried by a packet, and to route the packet according to the EEL tag.

Figure 9:
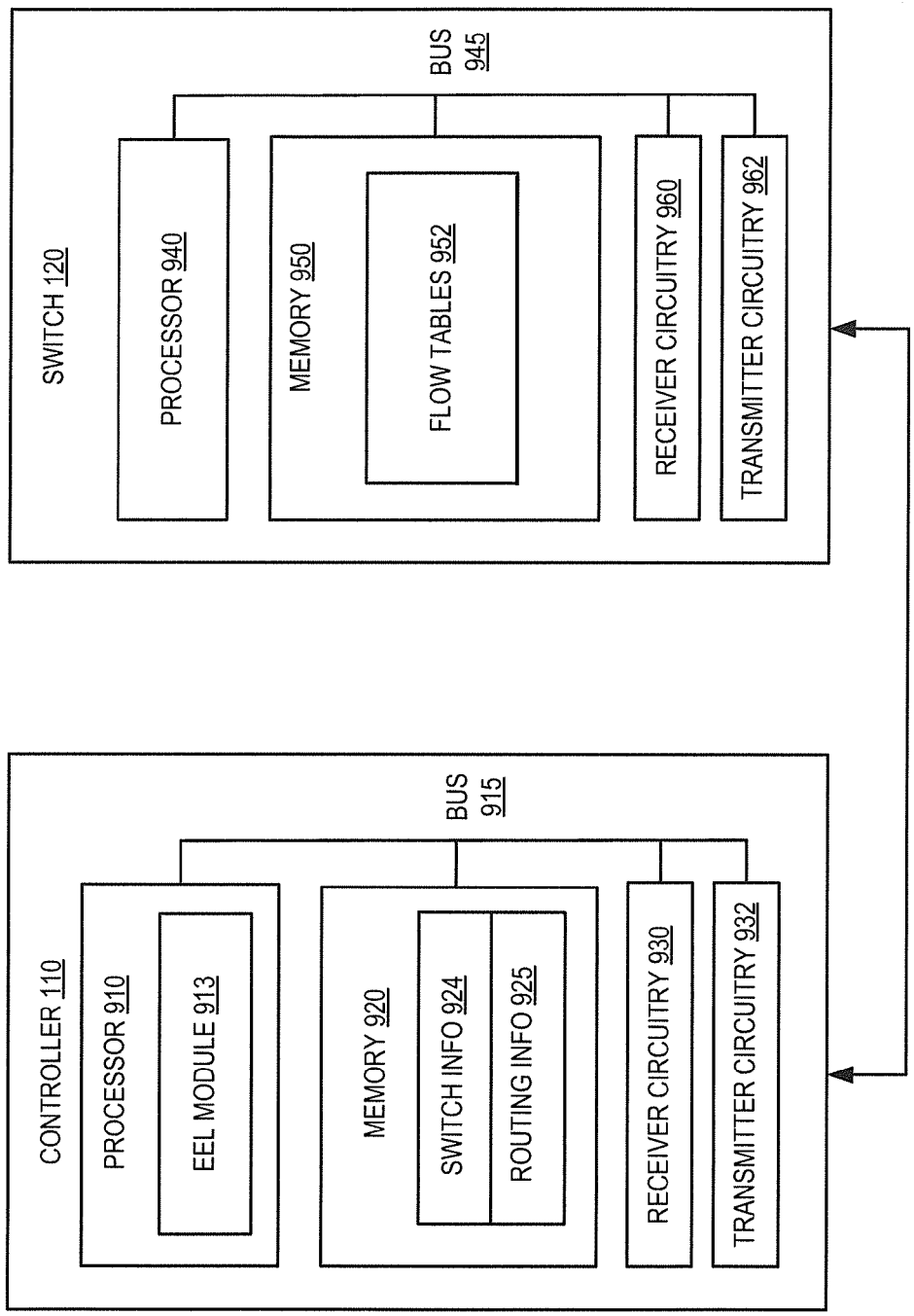
FIG. 9 is a diagram of a controller and a switch in a split architecture network according to one embodiment of the invention.

FIG. 9 illustrates an embodiment of the controller 110 and a switch 120 (e.g., the switches 120A-F) in the split architecture network 100 of FIG. 1. It is understood that other controllers (e.g., the controller 510 of FIG. 5) and switches in the split architecture network described above can include the same components as the controller 110 and the switch 120, respectively.

In one embodiment, the switch 120 functions as a forwarding element that forwards packets from an ingress port to an egress port, according to the rules in one or more flow tables 952 in a memory 950. In one embodiment, the switch 120 includes a processor 940 coupled to the memory 950, receiver circuitry 960 and transmitter circuitry 962 via a bus 945 or another form of interconnect. The flow table 952 contains a set of flow entries, which can be set by the controller 110 to record the rules for forwarding packets and for handling the EEL tags of the packets. For the first packet in a new flow, the switch 120 can forward the packet to the controller 110 to trigger the insertion of one or more new flow entries into its flow table 952.

In one embodiment, the controller 110 includes a processor 910 coupled to a memory 920, receiver circuitry 930 and transmitter circuitry 932 via a bus 915 or another form of interconnect. The receiver circuitry 930 and transmitter circuitry 932 provide an interface to other controllers, switches, and physical servers in the cloud network. The memory 920 stores switch information 924 and routing information 925 among other information. The switch information 224 stores memory, bandwidth, and location information of each of the switches managed by the controller 110. The routing information 225 stores the path information among the switches managed by the controller 110.

In one embodiment, the controller 110 also includes an EEL module 913 to perform the operations of extracting AppIDs from the packets forwarded from its switches, determining middlebox types, middlebox instances and the IP addresses of the middlebox instances, and adds rules to the switches. In one embodiment, the EEL module 913 has access to the policy table 261, gTag table 262 and iTag table 263 of FIG. 2. These tables may be stored in the memory 920 or other data storage accessible by the controller 110.

The operations of the diagrams of FIGS. 2-8 have been described with reference to the exemplary embodiment of FIG. 9. However, it should be understood that the operations of the diagrams of FIGS. 2-8 can be performed by embodiments of the invention other than those discussed with reference to FIG. 9, and the embodiment discussed with reference to FIG. 9 can perform operations different than those discussed with reference to the diagrams of FIGS. 4-6. While the diagrams of FIGS. 2-8 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network node). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware As used herein, a network node (e.g., a router, switch, bridge, controller) is a piece of networking equipment, including hardware and software, that communicatively interconnects other equipment on the network (e.g., other network nodes, end stations). Some network nodes are "multiple services network nodes" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network nodes, which are coupled (e.g., through one or more core network nodes) to other edge network nodes, which are coupled to other end stations (e.g., server end stations).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a controller in a split architecture network to control network connectivity for a cloud computing environment, the split architecture network including a plurality of switches coupled to the controller, wherein the controller manages a control plane for the plurality of switches and policy enforcement for network security for a plurality of virtual machines (VMs) including a source VM and a destination VM that execute applications in the cloud computing environment and exchange data via the split architecture network, the method comprising the steps of:

receiving by the controller a packet from the plurality of switches, the packet originating from the source VM, where the controller manages the control plane for the plurality of switches and the plurality of switches implement the data plane of the split architecture network;

extracting by the controller an application identifier from the received packet, the application identifier identifying an application running on the source VM;

determining by the controller a chain of middlebox types based on the application identifier;

mapping by the controller one or more of the middlebox types in the chain to corresponding one or more middlebox instances based on current availability of resources in the cloud computing environment, wherein one or more of the middlebox instances perform network security operations on the packet and the one or more middlebox instances are in communication with one or more of the plurality of switches; and sending by the controller a set of rules to the plurality of switches, the set of rules to add a set of tags to the packet to cause the plurality of switches to forward the packet toward the destination VM via the one or more middlebox instances to thereby enforce network security in the cloud computing environment.

2. The method of claim 1, wherein both the source VM and the destination VM are controlled by the controller, the step of determining further comprising the steps of:

mapping the chain of middlebox types to a chain of middlebox instances; and adding the set of rules to the plurality of switches to cause the plurality of switches to forward the packet to the destination VM via the chain of middlebox instances.

3. The method of claim 1, wherein the source VM is in a first area controlled by the controller and the destination VM is in a second area controlled by a second controller, the step of mapping further comprising the steps of:
  mapping by the controller a subset of middlebox types in the chain of middlebox types to a subset of middlebox instances; and
  deferring mapping of remaining middlebox types in the chain of middlebox types to the second controller.

4. The method of claim 1, wherein the step of adding further comprises the step of adding a single rule to a given one of the plurality of switches to cause the given switch to route packets toward a same middlebox instance according to the single rule, wherein the packet have different application identifiers, originating from different VMs, or destined for different VMs.

5. The method of claim 1, further comprising the steps of:
  receiving a second packet originating from the source VM that has migrated from a first physical server to a second physical server;
  extracting an application identifier from the second packet, the application identifier being the same as before migration of the source VM; and
  mapping the application identifier to a same chain of middlebox types as before the migration of the source VM.

6. The method of claim 5, wherein a same middlebox type is mapped to different middlebox instances before and after the migration of the source VM.

7. The method of claim 1, wherein the application identifier carried by packets emitted by the source VM stays the same after the source VM migrates to a different physical server.

8. The method of claim 1, wherein one of the rules specifies that an ingress switch of a given one of the middlebox instances is to pop a tag carried by the packet, the tag having a value pointing to the given middlebox instance.

9. The method of claim 1, wherein one of the rules specifies that an egress switch of a given one of the middlebox instances is to push a tag carried by the packet, the tag having a value pointing to a next middlebox instance toward which the packet is to be sent by the egress switch.

10. The method of claim 1, further comprising the steps of:
  mapping a middlebox type in the chain to a set of middlebox instances;
  choosing a middlebox instance from the set; and
  identifying an Internal Protocol (IP) address of the middlebox instances being chosen.

11. A network node functioning as a controller in a split architecture network to control network connectivity for a cloud computing environment, the split architecture network including a plurality of switches coupled to the controller, wherein the controller manages a control plane of the plurality of switches and policy enforcement for network security for a plurality of virtual machines (VMs) including a source VM and a destination VM that execute applications in the cloud computing environment and exchange data via the split architecture network, the controller comprising:
  receiver circuitry configured to receive a packet from one of the plurality of switches, the packet originating from the source VM, where the controller manages the control plane for the plurality of switches and the plurality of switches implement the data plane of the split architecture network; and
  a processor coupled to the receiver circuitry and a memory, the processor configured to execute an elastic enforcement module, which is configured to
    extract an application identifier from the received packet, the application identifier identifying an application running on the source VM;
    determine a chain of middlebox types based on the application identifier; and
    map one or more of the middlebox types in the chain to corresponding one or more middlebox instances based on current availability of resources in the cloud computing environment, wherein one or more of the middlebox instances perform network security operations on the packet and the one or more middlebox instances are in communication with one or more of the plurality of switches; and
  transmitter circuitry coupled to the processor, the transmitter circuitry configured to send a set of rules to the plurality of switches to add a set of tags to the packet to cause the plurality of switches to forward the packet toward the destination VM via the one or more middlebox instances to thereby enforce network security in the cloud computing environment.

12. The network node of claim 11, wherein both the source VM and the destination VM are controlled by the controller, and wherein the controller is further configured to map the chain of middlebox types to a chain of middlebox instances, and to add the set of rules to the plurality of switches to cause the plurality of switches to forward the packet to the destination VM via the chain of middlebox instances.

13. The network node of claim 11, wherein the source VM is in a first area controlled by the controller and the destination VM is in a second area controlled by a second controller, and wherein the controller is further configured to map a subset of middlebox types in the chain of middlebox types to a subset of middlebox instances, and to defer mapping of remaining middlebox types in the chain of middlebox types to the second controller.

14. The network node of claim 11, wherein the controller is further configured to add a single rule to a given one of the plurality of switches to cause the given switch to route packets toward a same middlebox instance according to the single rule, wherein the packet have different applications identifiers, originating from different VMs, or destined for different VMs.

15. The network node of claim 11, wherein the controller is further configured to receive a second packet originating from the source VM that has migrated from a first physical server to a second physical server, extract the application identifier from the second packet, the application identifier being the same as before migration of the source VM, and map the application identifier to a same chain of middlebox types as before the migration of the source VM.

16. The network node of claim 14, wherein a same middlebox type is mapped to different middlebox instances before and after the migration of the source VM.

17. The network node of claim 11, wherein the application identifier carried by packets emitted by the source VM stays the same after the source VM migrates to a different physical server.

18. The network node of claim 11, wherein one of the rules specifies that an ingress switch of a given one of the middlebox instances is to pop a tag carried by the packet, the tag having a value pointing to the given middlebox instance.

19. The network node of claim 11, wherein one of the rules specifies that an egress switch of a given one of the middlebox instances is to push a tag carried by the packet, the tag having a value pointing to a next middlebox instance toward which the packet is to be sent by the egress switch.

20. The network node of claim 11, wherein the controller is further configured to map a middlebox type in the chain to a set of middlebox instances, choose a middlebox instance from the set, and identify an Internal Protocol (IP) address of the middlebox instances being chosen.

* * * * *